United States Patent
Chang (10) Patent No.: US 11,424,983 B2
(45) Date of Patent: *Aug. 23, 2022

(54) DYNAMICALLY RECONFIGURING DATA PLANE OF FORWARDING ELEMENT TO ACCOUNT FOR OPERATING TEMPERATURE

(71) Applicant: Barefoot Networks, Inc., Santa Clara, CA (US)

(72) Inventor: Remy Chang, Milpitas, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,680

(22) Filed: May 8, 2020

(65) Prior Publication Data

US 2020/0344122 A1    Oct. 29, 2020

Related U.S. Application Data

(63) Continuation of application No. 15/683,745, filed on Aug. 22, 2017, now Pat. No. 10,693,725.

(Continued)

(51) Int. Cl.
*H04L 41/0833*    (2022.01)
*G06F 1/3234*    (2019.01)
(Continued)

(52) U.S. Cl.
CPC .......... *H04L 41/0833* (2013.01); *G06F 1/04* (2013.01); *G06F 1/206* (2013.01); *G06F 1/32* (2013.01);
(Continued)

(58) Field of Classification Search
None
See application file for complete search history.

(56) References Cited

U.S. PATENT DOCUMENTS 6,651,176 B1    11/2003    Soltis, Jr. et al.
7,051,221 B2 *   5/2006    Clabes ................ G06F 9/30149
                                                                713/320

(Continued)

OTHER PUBLICATIONS

Final Office Action for U.S. Appl. No. 15/683,742, dated Nov. 18, 2019, 15 pages.

(Continued)

*Primary Examiner* — Gregory B Sefcheck
*Assistant Examiner* — Suk Jin Kang
(74) *Attorney, Agent, or Firm* — Compass IP Law PC (57) ABSTRACT

Some embodiments of the invention provide a network forwarding element that can be dynamically reconfigured to adjust its data message processing to stay within a desired operating temperature or power consumption range. In some embodiments, the network forwarding element includes (1) a data-plane forwarding circuit ("data plane") to process data tuples associated with data messages received by the IC, and (2) a control-plane circuit ("control plane") for configuring the data plane forwarding circuit. The data plane includes several data processing stages to process the data tuples. The data plane also includes an idle-signal injecting circuit that receives from the control plane configuration data that the control plane generates based on the IC's temperature. Based on the received configuration data, the idle-signal injecting circuit generates idle control signals for the data processing stages. Each stage that receives an idle control signal enters an idle state during which the majority of the components of that stage do not perform any operations, which reduces the power consumed and temperature generated by that stage during its idle state.

23 Claims, 7 Drawing Sheets

Related U.S. Application Data (60) Provisional application No. 62/456,641, filed on Feb. 8, 2017, provisional application No. 62/426,674, filed on Nov. 28, 2016.

(51) Int. Cl.
| | |
|---|---|
| *G06F 1/04* | (2006.01) |
| *H04L 45/745* | (2022.01) |
| *H04L 49/25* | (2022.01) |
| *H04L 49/00* | (2022.01) |
| *H04L 45/00* | (2022.01) |
| *G06F 1/20* | (2006.01) |
| *G06F 1/32* | (2019.01) |
| *G06F 3/06* | (2006.01) |
| *G06F 13/16* | (2006.01) |
| *H04L 49/40* | (2022.01) |
| *H04L 49/50* | (2022.01) |
| *H04L 49/505* | (2022.01) |
| *H04L 69/22* | (2022.01) |
| *H04L 47/30* | (2022.01) |
| *H04L 45/64* | (2022.01) |

(52) U.S. Cl.
CPC ............ *G06F 1/3234* (2013.01); *G06F 3/065* (2013.01); *G06F 3/067* (2013.01); *G06F 3/0613* (2013.01); *G06F 13/161* (2013.01); *G06F 13/1642* (2013.01); *H04L 45/38* (2013.01); *H04L 45/745* (2013.01); *H04L 49/25* (2013.01); *H04L 49/3063* (2013.01); *H04L 49/40* (2013.01); *H04L 49/501* (2013.01); *H04L 49/505* (2013.01); *H04L 45/64* (2013.01); *H04L 47/30* (2013.01); *H04L 69/22* (2013.01)

(56) References Cited

U.S. PATENT DOCUMENTS

| | | |
|---|---|---|
| 7,236,488 B1 | 6/2007 | Kavipurapu |
| 7,266,708 B2 * | 9/2007 | Miller .................. G06F 1/3237 713/300 |
| 7,573,301 B2 | 8/2009 | Walmsley |
| 7,681,056 B2 | 3/2010 | Abernathy et al. |
| 8,031,503 B1 * | 10/2011 | Gyllenhammer ...... G11C 15/04 365/49.18 |
| 8,201,004 B2 | 6/2012 | Anderson et al. |
| 8,792,348 B1 | 7/2014 | Channabasappa |
| 8,942,144 B2 | 1/2015 | Chang et al. |
| 8,977,876 B2 | 3/2015 | Yang et al. |
| 9,094,197 B2 | 7/2015 | Chang et al. |
| 9,386,517 B2 | 7/2016 | Tseng et al. |
| 9,552,040 B2 | 1/2017 | Yu |
| 9,602,293 B2 | 3/2017 | Chou et al. |
| 9,794,075 B2 | 10/2017 | Shi et al. |
| 10,070,384 B2 | 9/2018 | Kukosa |
| 10,158,546 B2 | 12/2018 | Gopalakrishnan |
| 10,285,125 B2 | 5/2019 | Kukosa |
| 10,298,456 B1 | 5/2019 | Chang |
| 10,693,725 B1 | 6/2020 | Chang |
| 10,877,670 B1 | 12/2020 | Chang |
| 2003/0131271 A1 | 7/2003 | Chen et al. |
| 2003/0191889 A1 * | 10/2003 | Forrer, Jr. ............... G11B 19/04 711/112 |
| 2004/0044915 A1 * | 3/2004 | Bose ..................... G06F 1/3243 713/320 |
| 2004/0236971 A1 | 11/2004 | Kopley et al. |
| 2004/0236973 A1 | 11/2004 | Srikantam et al. |
| 2005/0223262 A1 * | 10/2005 | Chen ........................ G06F 1/32 713/600 |
| 2007/0074054 A1 | 3/2007 | Chieh |
| 2007/0156370 A1 * | 7/2007 | White ................... G06F 1/3203 702/132 |
| 2008/0095058 A1 | 4/2008 | Dalmases et al. |
| 2008/0229078 A1 * | 9/2008 | Abernathy ............ G06F 1/3243 712/219 |
| 2009/0190466 A1 | 7/2009 | Girardi et al. |
| 2009/0197626 A1 | 8/2009 | Huttunen et al. |
| 2009/0273389 A1 | 11/2009 | Walmsley |
| 2010/0098047 A1 | 4/2010 | Zhou et al. |
| 2012/0147748 A1 | 6/2012 | Sato |
| 2012/0216067 A1 * | 8/2012 | Whatmough ........... G06F 1/324 714/2 |
| 2013/0027115 A1 * | 1/2013 | Park ........................ G06F 1/206 327/512 |
| 2013/0128746 A1 | 5/2013 | Yedavalli |
| 2014/0098669 A1 * | 4/2014 | Garg ........................ H04L 47/12 370/235 |
| 2014/0126444 A1 | 5/2014 | Tseng et al. |
| 2014/0298052 A1 | 10/2014 | Meirosu et al. |
| 2015/0180779 A1 | 6/2015 | Gopalakrishnan |
| 2016/0065723 A1 * | 3/2016 | Jung ........................ G16H 40/63 340/586 |
| 2016/0105471 A1 | 4/2016 | Nunes et al. |
| 2016/0173371 A1 * | 6/2016 | Bays ...................... H04L 45/60 370/389 |
| 2016/0330127 A1 * | 11/2016 | Kim ....................... H04L 47/622 |
| 2016/0342510 A1 * | 11/2016 | Pani ..................... G06F 12/0615 |
| 2017/0083066 A1 | 3/2017 | Mahurin et al. |
| 2017/0261380 A1 * | 9/2017 | Cher ........................ G01K 7/42 |
| 2017/0344234 A1 | 11/2017 | Xu |
| 2018/0046207 A1 * | 2/2018 | Wohlgethan ........ G05D 23/1934 |
| 2018/0241621 A1 * | 8/2018 | Vaishnavi ............. H04L 41/083 |
| 2018/0248788 A1 * | 8/2018 | Tsiatsis .................. H04L 45/64 |
| 2018/0262436 A1 * | 9/2018 | Thakkar ............... G06F 9/45558 |
| 2019/0007331 A1 * | 1/2019 | Bosshart ............. H04L 49/3009 |
| 2019/0223100 A1 | 7/2019 | Kukosa |
| 2020/0057479 A1 * | 2/2020 | Cher ........................ G06F 1/206 |

OTHER PUBLICATIONS

Final Office Action for U.S. Appl. No. 16/372,214, dated Oct. 14, 2020, 16 pages.

First Office Action for U.S. Appl. No. 15/683,742, dated May 31, 2019, 13 pages.

First Office Action for U.S. Appl. No. 15/683,743, dated Oct. 15, 2018, 14 pages.

First Office Action for U.S. Appl. No. 15/683,745, dated Dec. 13, 2018, 16 pages.

First Office Action for U.S. Appl. No. 16/372,214, dated Apr. 15, 2020, 14 pages.

Non-Published commonly Owned U.S. Appl. No. 16/372,214 filed Apr. 1, 2019, 41 pages, Barefoot Networks, Inc.

Notice of Allowance for U.S. Appl. No. 15/683,745, dated Feb. 4, 2020, 10 pages.

Second Office Action for U.S. Appl. No. 15/683,745, dated Jun. 6, 2019, 10 pages.

\* cited by examiner

DYNAMICALLY RECONFIGURING DATA PLANE OF FORWARDING ELEMENT TO ACCOUNT FOR OPERATING TEMPERATURE

CLAIM OF BENEFIT TO PRIOR APPLICATIONS

This application is a continuation of U.S. patent application Ser. No. 15/683,745, filed Aug. 22, 2017. U.S. patent application Ser. No. 15/683,745 claims the benefit of U.S. Provisional Patent Application 62/456,641, filed Feb. 8, 2017 and U.S. Provisional Patent Application 62/426,674, filed Nov. 28, 2016. The entire specifications of all of those patent applications are hereby incorporated herein by reference in their entirety.

BACKGROUND

A network forwarding chip often has to meet stringent operating temperature and power consumption requirements within a network forwarding element (e.g., a switch or a router). Meeting these requirements is often not trivial, as it requires controlling the dynamic power consumption of the network forwarding chip. This is because modern fabrication processes use advanced lithographic processes to produce semiconductor chips with very small feature sizes (e.g., smaller transistor gate lengths, etc.). The smaller feature sizes allow many high-speed components (e.g., transistors) to be defined on the chip. Most of these components consume the majority of their power during their dynamic operations (e.g., when they are changing their states). As a component's contribution to the operating temperature of the chip is related to the component's power consumption, the component's temperature contribution is primarily related to its dynamic operation.

To date, there have not been many good solutions for controlling the operating temperature and power consumption of network forwarding chips. Therefore, there is a need in the art for novel techniques that can control the operating temperature and power consumption of network forwarding chips.

SUMMARY

Some embodiments of the invention provide a network forwarding data plane circuit ("data plane") that can be dynamically reconfigured to adjust its data message processing to stay below a maximum operating temperature. Instead of or in conjunction with this capability, the data plane of some embodiments can be dynamically reconfigured to adjust its data message processing to stay below a desired power consumption level. Also, in some embodiments, the data plane can be dynamically reconfigured to increase its data message processing for a transient period of time in order to alleviate congestion in its message storing queues.

In some embodiments, the data-plane forwarding circuit ("data plane") is implemented as an application specific integrated circuit (ASIC). Also, in some embodiments, the data plane process data tuples associated with data messages received by the data plane. Typically, the data-plane forwarding circuit is part of a network forwarding element (e.g., a switch, a router, etc.) that includes a control-plane circuit ("control plane") that configures the data-plane forwarding circuit. The data plane includes several data processing stages to process the data tuples. The operations of these processing stages are typically configured by the control plane.

The data plane also includes an idle-signal injecting circuit that receives from the control plane configuration data that the control plane generates based on the data plane's operating temperature. Based on the received configuration data, the idle-signal injecting circuit generates idle control signals for the data processing stages. Each stage that receives an idle control signal enters an idle state during which the majority of the components of that stage do not perform any operations, which reduces the power consumed and temperature generated by that stage during its idle state.

The data-plane forwarding circuit in some embodiments has a set of one or more temperature sensors that detect the temperature of the data-plane forwarding circuit and report this detected temperature to the control plane. In some embodiments, the temperature sensor set includes one or more thermal diodes, each of which outputs a current that is based on the junction temperature on the data-plane forwarding IC's die. The temperature sensor includes a converter circuit that converts the current output by the thermal diode(s) to a value that is associated with the operating temperature of the IC. This value is then provided to the control plane, which then uses this value to identify the operating temperature of the IC.

In some embodiments, the idle-signal injecting circuit is part of a parsing circuit that (1) parses the headers of the data messages (e.g., the packets) that the data-plane forwarding circuit receives, and (2) generates a set of data tuples for each received data message for the data plane's data processing stages to process. Each data tuple set is referred to below as a header vector. In some embodiments, the parser extracts a data message's payload and passes this payload along another path (that does not traverse through the data plane's data processing stages) to a deparser that combined the payload with the message's processed header vector to reconstitute the data message. In some embodiments, the header vector only includes L4, L3 and/or L2 header values, while in other embodiments, the header vector also includes higher layer parameters, such as L7 parameters.

In some embodiments, the parsing circuit includes several parsers, with each parser processing data messages that it receives (e.g., processing data messages received at one of the physical input interfaces of the data-plane forwarding circuit). These parsers provide the header vectors that they generate to an arbitration circuit of the parsing circuit. The arbitration circuit has (1) a set of queues for storing these header vectors, and (2) a data fetcher for retrieving header vectors from the set of queues and passing them through the data processing stages of the data plane.

In some embodiments, each header vector sequentially passes through several data processing stages including a set of ingress data processing stages and a set of egress data processing stages that respectively are before and after a traffic manager of the data plane. The traffic manager includes (1) queues that store the data messages (including their associated header vectors) and (2) a switching fabric that acts as a crossbar switch for directing data messages from different ingress pipelines to different egress processing pipelines. In some embodiments, the different pipelines are associated with different ports of the data-plane forwarding circuit. By directing the data messages between different ingress and egress pipelines that are associated with different ports, the traffic manager's switching fabric in these embodiments performs the forwarding operation of the forwarding element by directing data messages between the input and output ports of the data-plane forwarding circuit.

The idle-signal injecting circuit is part of the data fetcher of the arbitration circuit in some embodiments. Based on configuration data received from the control plane and stored in a storage (e.g., a register) accessible to the data fetcher, the data fetcher generates idle control signals at a particular rate (e.g., an idle control signal for each set of N header vectors transmitted, or transmitted every M microseconds), and sends these signals as header vectors through the data processing stages of the data plane. Like the other header vectors, each idle-signal header vector sequentially passes through several data processing stages.

In some embodiments, each idle-signal header vector has only a subset of bits that matter, and all its other bits (even if defined) are irrelevant. For instance, in some embodiments, the idle-signal header vector has only one bit that matters, a valid bit. This valid bit controls a set of clock gating circuits for each data processing stage that receives this valid bit. When this valid bit is inactive (e.g., it has a low value), a clock gating circuit set of a data processing stage that receives this valid bit will not clock (i.e. will maintain the clock signal inactive for) a set of input storage units (e.g., a set of flip-flops) that receive and maintain that stage's input values. In other embodiments, the idle control signals are signals that are transmitted through the data processing stages of the data plane separately from the header vectors.

By preventing these input storage units from receiving the active clock signal, these storage units do not change the values that they store (i.e., do not change state). By not changing their state and remaining idle, these input storage units consume less power, which over a sufficient number of idle cycles for a sufficient number of stages reduces the temperature of the data-plane forwarding circuit. Maintaining the inputs of a data processing stage constant during two or more successive clock cycles prevents that stage's processing modules (e.g., its match action units, memories, logic units, etc.) from performing new operations in one or more of the successive clock cycles, which further reduces the dynamic power consumption of the data-plane forwarding circuit and thereby further allows the data-plane forwarding circuit to cool.

Instead of, or in conjunction with, injecting idle signals to control temperature, some embodiments inject idle signals to control power consumption of the data-plane forwarding circuit. For instance, the data-plane forwarding circuit of some embodiments is used by a network forwarding element that has a power regulator that identifies the power consumed by the forwarding element and/or by the data-plane forwarding circuit. In some embodiments, the power regulator is an on-chip regulator that is implemented on the data-plane forwarding circuit. In other embodiments, the power regulator is not on the data-plane forwarding circuit (i.e., the regulator is part of the network forwarding element, but not the data-plane forwarding circuit).

When the consumed power exceeds or nears a particular threshold value, the power regulator generates a signal that is supplied to the control plane directly or indirectly (e.g., through another component of the forwarding element that generates a signal to the control plane in response to the signal from the power regulator). In response to this signal, the control plane dynamically reconfigures the idle-signal injecting circuit to increase the number of idle signals it generates, in order to reduce the power consumption of the data-plane forwarding circuit.

As mentioned above, the idle signals in some embodiments prevent the input storage units of the data processing stages from receiving the active clock signal, which prevents these storage units from changing their values (i.e., prevents them from changing state), and thereby allows them to consume less power. This power saving can be significant because the vast majority of power consumption of a typical data plane today is its dynamic power consumption (as opposed to its static power consumption).

Also, as mentioned above, maintaining the inputs of a data processing stage constant during two or more successive clock cycles causes that stage's processing modules (e.g., its match action units, memories, logic units, etc.) from performing new operations in one or more of the successive clock cycles, which further reduces the dynamic power consumption of the data-plane forwarding circuit. Examples of operations that the stage's processing modules will not perform include instruction or data lookup operations, data write operations, arithmetic operations, etc.

Instead of increasing the number or frequency of the idle signals to reduce the data plane's operating temperature or power consumption, some embodiments dynamically reconfigure the idle-signal injecting circuit of the data plane to reduce the number of idle signals it generates, in order to increase the data message processing of the data-plane forwarding circuit for a transient period of time. For example, in some embodiments, the data-plane forwarding circuit is designed for a first data throughput rate, but it can, for a time period, increase its data message processing throughput to reach a higher second data throughput rate in order to alleviate the build up of data messages in one or more queues in the data plane. In these embodiments, the control plane has a set of one or more monitoring processes that detect when a set of one or more queues in the data plane have exceeded a particular depth. In response to this detection, the control plane reconfigures the idle-signal generator(s) of the data plane to reduce the number or frequency of the generated idle signals in order to increase the data plane's data message processing throughput for a transient period of time.

In some embodiments, the data-plane forwarding circuit is configured by a set of design automation software tools that allow the data-plane forwarding circuit to custom select any subset of R features, from a set of S available features that can be implemented by the data-plane forwarding circuit (where R and S are integers and R is equal to or less than S), in order to stay within a desired power consumption level. Accordingly, the same manufacturer, or different manufacturers, of network forwarding elements that deploy the data-plane forwarding circuits of some embodiments can differently configure two identical data-plane forwarding circuits to implement two different subsets of features to operate within two different power consumption levels. The two data-plane circuits are configured to operate with two different power consumption levels in some embodiments by having their idle signal generators pass idle signals through the data plane circuits at two different rates (i.e., two different frequencies).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a network forwarding data plane circuit ("data plane") that can be dynamically reconfigured to adjust its data message processing to stay below a maximum operating temperature. Instead of or in conjunction with this capability, the data plane of some embodiments can be dynamically reconfigured to adjust its data message processing to stay below a desired power consumption level. Also, in some embodiments, the data plane can be dynamically reconfigured to increase its data message processing for a transient period of time in order to alleviate congestion in its message storing queues.

In some embodiments, the data-plane forwarding circuit ("data plane") is implemented as an application specific integrated circuit (ASIC). Also, in some embodiments, the data plane process data tuples associated with data messages received by the data plane. Typically, the data-plane forwarding circuit is part of a network forwarding element (e.g., a switch, a router, etc.) that includes a control-plane circuit ("control plane") that configures the data-plane forwarding circuit. The data plane includes several data processing stages to process the data tuples. The operations of these processing stages are typically configured by the control plane.

The data plane also includes an idle-signal injecting circuit that receives from the control plane configuration data that the control plane generates based on the data plane's operating temperature. Based on the received configuration data, the idle-signal injecting circuit generates idle control signals for the data processing stages. Each stage that receives an idle control signal enters an idle state during which the majority of the components of that stage do not perform any operations, which reduces the power consumed and temperature generated by that stage during its idle state.

The data-plane forwarding circuit in some embodiments has a set of one or more temperature sensors that detect the temperature of the data-plane forwarding circuit and report this detected temperature to the control plane. In some embodiments, the temperature sensor set includes one or more thermal diodes, each of which outputs a current that is based on the junction temperature on the data-plane forwarding IC's die. The temperature sensor includes a converter circuit that converts the current output by the thermal diode(s) to a value that is associated with the operating temperature of the IC. This value is then provided to the control plane, which then uses this value to identify the operating temperature of the IC.

Figure 1:
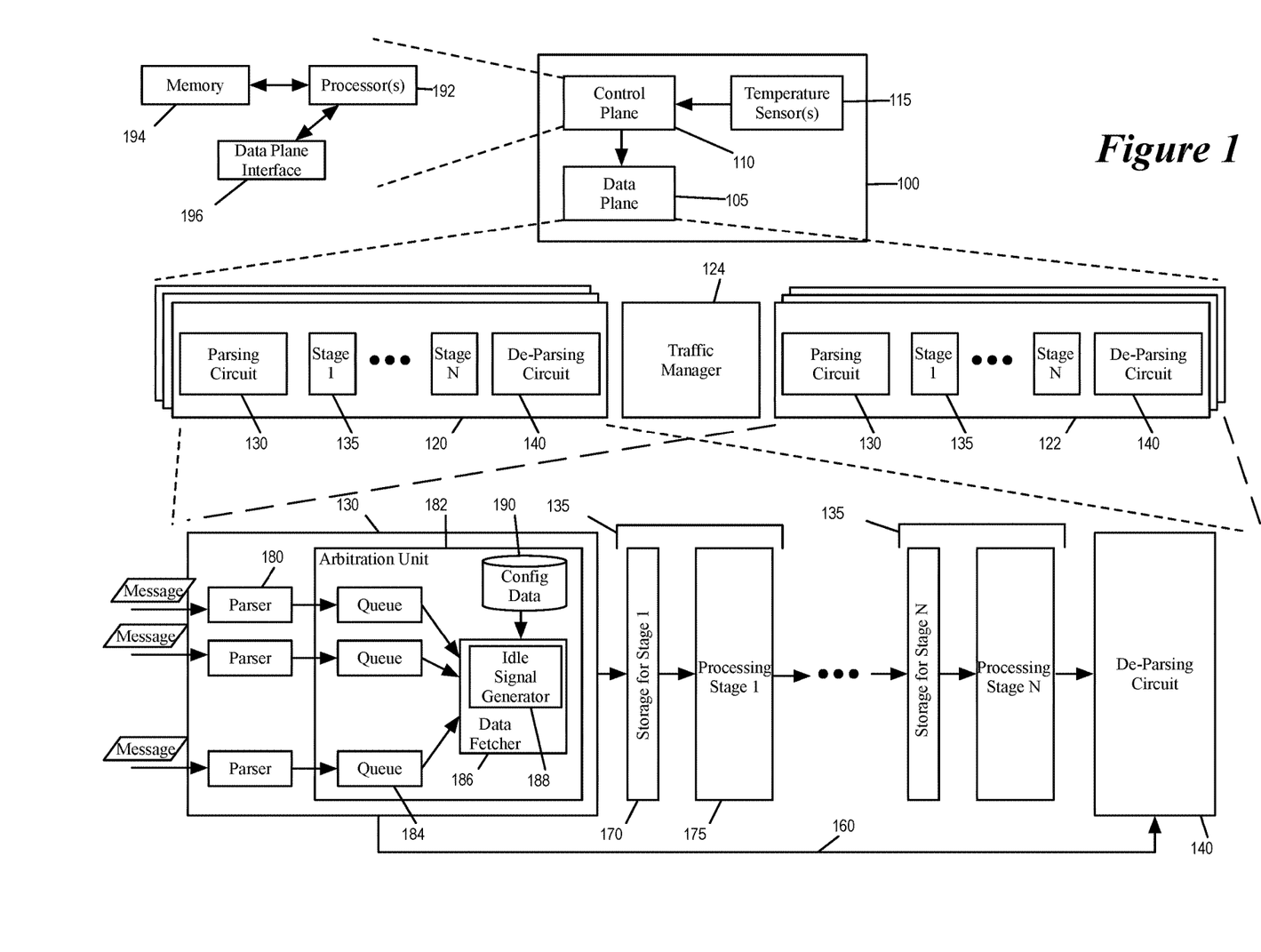
FIG. 1 illustrates an example of a network forwarding element of some embodiments.

FIG. 1 illustrates an example of a network forwarding element of some embodiments that has a data plane that can be dynamically reconfigured to adjust its data message processing to stay below a maximum operating temperature. The network forwarding element 100 is a standalone network forwarding element (e.g., a standalone network switch or router) in some embodiments, while it is a forwarding element that is part of a computer (e.g., is incorporated in a network interface card of a computer) in other embodiments.

As shown, the network forwarding element 100 includes a data-plane forwarding circuit 105, a control-plane circuit 110, and a set of one or more temperature sensors 115. In some embodiments, the data-plane forwarding circuit 105 and the control-plane circuit 110 are on different IC dies that are packaged on different IC chips. In other embodiments, these two circuits are on different IC dies that are packaged within the same IC chip. In still other embodiments, these two circuits are on the same IC die that is packaged on the same IC chip.

The data plane circuit 105 is the forwarding IC in some embodiments that is used by the network forwarding element 100 to perform the forwarding operations that determine how the forwarding element should forward received data messages to the data message destinations (e.g., to computers connected to the electronic device) or to other network forwarding elements. As shown, the data-plane forwarding circuit 105 includes several parallel ingress pipelines 120, several parallel egress pipelines 122, and a traffic manager 124. Each of the pipelines 120 and 122 includes a parsing circuit 130, multiple data processing stages 135, and a de-parsing circuit 140.

A temperature sensor 115 detects the temperature of the IC and reports this detected temperature to the control-plane circuit 110 ("control plane"). In some embodiments, each temperature sensor includes one or more thermal diodes that sense the junction temperature on the IC die of the data plane forwarding circuit. A thermal diode in some embodiments outputs a current that is based on the junction temperature on the IC die. In some embodiments, the temperature sensor includes a converter circuit that converts the current output by the thermal diode(s) to a value that is associated with the operating temperature of the IC. This value is then provided to the control plane, which then uses this value to identify the operating temperature of the data-plane forwarding circuit.

The control plane 110 configures the data plane forwarding circuit 105 ("data plane"). In some embodiments, the control plane includes one or more processors 192 that execute instructions and a memory 194 that stores instructions. In some embodiments, each processor 192 is a microprocessor with multiple processing cores or units. Examples of such a microprocessor include any off-the-shelf processors commonly available today. In contrast to such off-the-shelf microprocessor, the data-plane forwarding circuit 105 is an application specific IC (ASIC) in some embodiments.

The instructions for the processor(s) 192 can be specified by (1) a manufacturer of the network forwarding element 100, (2) a network administrator that deploys and maintains the network forwarding element 100, or (3) one or more automated processes that execute on servers and/or network forwarding elements that monitor network conditions. A processor 192, or another circuit of the control plane, communicates with the data plane (e.g., to configure the data plane or to receive statistics from the data plane) through a data plane interface (e.g., a peripheral device interface, such as a PCIe interface).

In some embodiments, the data plane 105 processes data tuples associated with data messages received by the forwarding element, in order to forward the data messages to their destinations or their next hops. Specifically, the data plane 105 processes data tuples (e.g., message headers) associated with the received data messages in order to forward the data messages to destination devices connected to the forwarding element or to other forwarding elements in a network that serve as the next hops in the network for the data messages. In some embodiments, the data plane's processing stages process the data tuple processes data tuples to forward the data messages to destination devices or to other forwarding elements in the network, by comparing the data tuples with flow-entries that the control-plane circuit provides the data-plane forwarding circuit. Examples of such flow-entries include ACL flow-match entries that are stored in one or more match-action tables of the data processing stages.

As further described below, the data plane includes at least one idle-signal injecting circuit 188 that (1) receives from the control plane configuration data that the control plane generates based on the data plane's temperature, and (2) based on the received configuration data, generates idle control signals for the data processing stages of the data plane. Some embodiments only have idle-signal injecting circuits 188 in the parallel ingress pipelines 122 (e.g., in the parsing circuit 130 of each ingress pipeline 120). Other embodiments have an idle-signal injecting circuit 188 in each ingress or egress pipeline 120 or 122 (e.g., in the parsing circuit 130 of each ingress or egress pipeline 120 or 122). Each stage that receives an idle control signal enters an idle state during which all or a majority of the components of that stage do not perform any operations, which reduces the power consumed and temperature generated by that stage during its idle state.

When the data-plane forwarding circuit receives a data message, the message in some embodiments is directed to an ingress pipeline 120. In some embodiments, different ingress and egress pipelines are associated with different physical ports of the data-plane forwarding circuit 105. In some embodiments, the parsing circuit 130 of the ingress pipeline 120 that receives a data message (1) parses the headers of the data messages (e.g., the packets), and (2) generates a set of data tuples for each received data message for the data plane's data processing stages to process. Each data tuple set is referred to below as a header vector, as typically the parsing circuit separates a data message's header from its payload, defines a header vector from the header, and passes the payload along another path 160 (that does not traverse through the ingress pipeline's data processing stages 135) to the de-parser 140 of the ingress pipeline. The structure of the parsing circuit 130 will be further described below.

The parsing circuit 130 of the ingress pipeline passes each header vector that it generates to the first data processing stage 135. In some embodiments, each header vector then sequentially passes through each of the data processing stages 135 of the ingress pipeline until it reaches the de-parser 140 of this pipeline. In some embodiments, each data processing stage includes a storage unit 170 and a match-action-unit (MAU) 175. For each clock cycle, the storage unit 170 receives the input to the MAU 175, and holds this input constant while the MAU 175 performs its operation, unless the storage unit receives an idle signal. The storage unit 170 includes a set of flip-flops in some embodiments. When the storage unit 170 for a data processing stage receives an idle signal, it does not change its state (i.e., does not receive new input), which prevents it from consuming power for a state change and prevents it from supplying new input for the MAU to process. This will be further described below.

Each stage's MAU 175 searches one or more tables to identify records that match a header vector (i.e., to perform lookups based on the header vectors) and performs actions based on the matching records (i.e., performs actions based on the lookups). In some embodiments, an MAU includes a sequence of stages, with each stage including one or more match tables and an action engine. Each match table includes a set of match entries against which the header fields are matched (e.g., using hash tables), with the match entries referencing action entries. When the header vector matches a particular match entry, that particular match entry references a particular action entry that specifies a set of actions to perform on the header vector (e.g., sending the data message to a particular port, modifying one or more header field values, dropping the data message, mirroring the data message to a mirror buffer, etc.). The action engine of the stage performs the actions on the header vector, which is then sent to the next stage of the MAU.

The de-parser 140 reconstructs the data message using the header vector received from the last data processing stage 135 (as modified by the data processing stages 135) and the payload received directly from the parsing circuit 130. In some embodiments, the de-parser constructs a data message that can be sent out onto the wire. The de-parser of the ingress pipeline provides the data message that it reconstructs to the traffic manager 124.

After passing through the selected ingress pipeline 120, a data message arrives at the traffic manager 124. The traffic manager includes queues that store the data messages (including their associated header vectors) and the data plane's switching fabric that acts as a crossbar switch that dispatches the data message to one of the egress pipelines 122. The traffic manager's switching fabric allows this manager 124 to direct a data message that is received along an ingress pipeline associated with a physical port that received the data message, to an egress pipeline associated with the same or different physical port that needs to transmit the data message.

Once the traffic manager dispatches the data message to an egress pipeline 122, the data message is processed in the same fashion as described above for the ingress pipeline 120. In other words, the egress pipeline's parsing circuit extracts a header vector from the data message, passes this header vector to the data processing stages 135 of its pipeline, and passes the data message's payload to the pipelines de-parser 140. The data processing stages sequentially process the header vector and provide this header vector to the de-parser to reconstitute the data message (when the message does not get dropped) to transmit along one of the physical ports. In general, a typical data message will be processed once by an ingress pipeline, the traffic manager, and an egress pipeline.

As mentioned above, the control plane 110 reconfigures the data plane's idle-signal injecting circuit 188 whenever a temperature sensor detects that the data plane's temperature has passed a threshold, so that this circuit 188 can inject idle signals into the data processing pipeline to reduce the temperature of the data plane. As shown, the idle-signal injecting circuit is part of a parsing circuit 130. The parsing circuit 130 includes several parsers 180, with each parser processing data messages that it receives (e.g., processing data messages received at one of the physical input interfaces of the data plane forwarding circuit).

Each parser, in some embodiments, receives a data message as a formatted collection of bits in a particular order, and parses the message into its constituent header fields according to a parse graph state machine. That is, the parser starts from the beginning of the message and parses each header field in order, assigning these header fields to fields of a message header vector for processing. Based on the values of certain fields (e.g., the Ethertype field of an Ethernet header, the Protocol field of an Internet Protocol header, etc.), the parser can determine the structure of the next set of header fields. In some embodiments, each parser 180 separates out the message headers (up to a designated point) from the payload of the message, and sends the payload directly to the de-parser 140 through path 160 without going through the MAU processing stages. In other embodiments, while sending the payload directly to the de-parser 140, the parser 180 also sends passes some or all part of the payload through the MAU processing stages.

The parsers 180 provide the header vectors that they generate to an arbitration circuit 182 of the parsing circuit 130. The arbitration circuit has (1) a set of queues 184 for storing these header vectors, and (2) a data fetcher 186 for retrieving header vectors from the set of queues 184 and passing them through the data processing stages of the data plane based on the priorities of the data messages and/or queues.

As shown, the idle-signal injecting circuit 188 is part of the data fetcher 186 of the arbitration circuit in some embodiments. Based on configuration data received from the control plane and stored in a configuration storage 190 (e.g., a register) accessible to the data fetcher, the data fetcher generates idle control signals at a particular rate (e.g., an idle control signal for each set of N header vectors transmitted, or each set of N header vectors transmitted every M microseconds), and sends these signals as header vectors through the data processing stages of the data plane. Like the other header vectors, each idle-signal header vector sequentially passes through several data processing stages.

In some embodiments, each idle-signal header vector has only a subset of bits that matter, and all of its other bits (even if defined) are irrelevant. For instance, in some embodiments, the idle-signal header vector has only one bit that matters, a valid bit. This valid bit controls a set of clock gating circuits that control the clock signal that is supplied to the storage units 170 of each data processing stage 135 that receives this valid bit. When this valid bit is inactive (e.g., it has a low value), a clock gating circuit set of a data processing stage 135 that receives this valid bit will not clock (i.e. will maintain the clock signal inactive for) the storage units 170 that receive and maintain this stage's input values for the MAU 175 of this stage. The clock gating circuit of some embodiments will be further described below by reference to FIG. 7.

By preventing the storage unit 170 of a stage 135 from receiving the active clock signal, the active idle bit prevents the storage unit 170 from changing the values that it stores (i.e., does not change state). By not changing its state and remaining idle, the storage unit consumes less power, which over a sufficient number of idle cycles for a sufficient number of stages reduces the temperature of the IC. Maintaining the inputs of a data processing stage constant during two or more successive clock cycles prevents that stage's MAU 175 (including its match engine, action engine, memories, logic units, etc.) from performing new operations in one or more of the successive clock cycles, which further reduces the dynamic power consumption of the IC and thereby further allows the IC to cool.

Figure 2:
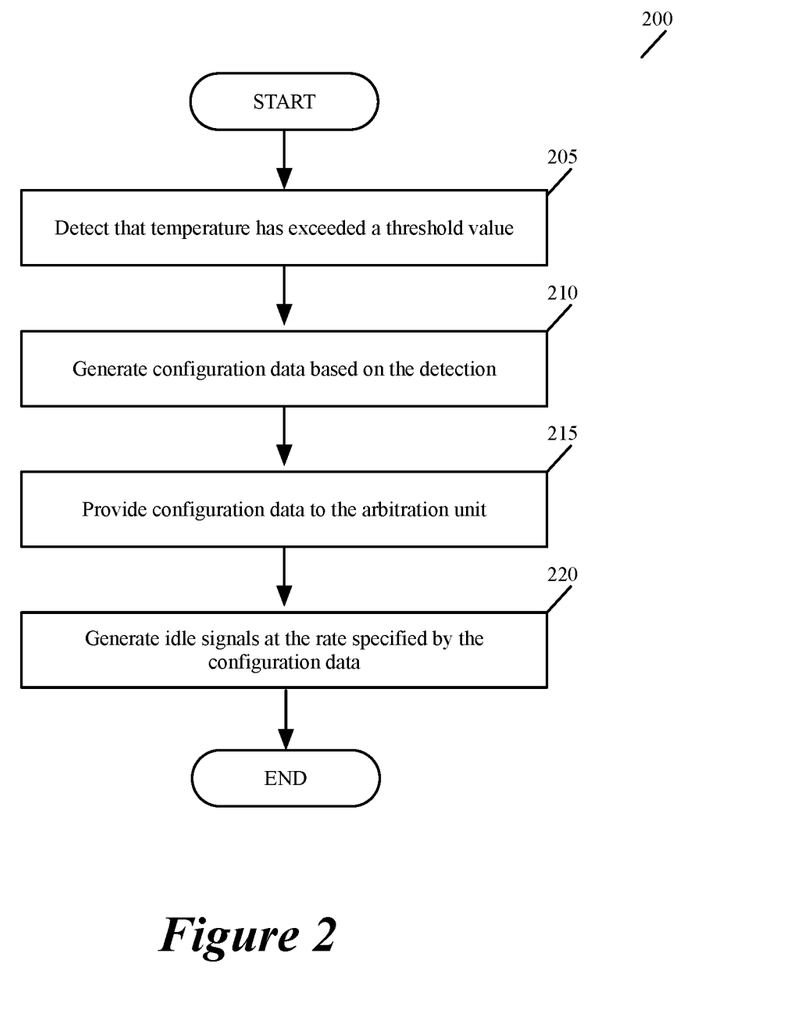
FIG. 2 illustrates a process that the network forwarding elements performs in some embodiments to increase the rate of idle signal generation in order to decrease the operating temperature of its data-plane forwarding circuit.

FIG. 2 illustrates a process 200 that the network forwarding element performs in some embodiments to increase the rate of idle signal generation of the data plane in order to decrease the operating temperature of the data-plane forwarding circuit. The first three operations of the process 200 are performed by the control plane 110, while the fourth operation of this process is performed by the data plane 105. As shown, the control plane initially detects (at 205) that the operating temperature of the data plane has exceeded a particular temperature value.

In some embodiments, the control plane detects this condition when it receives a signal from an on-chip temperature sensor 115 of the data plane 105 that the junction temperature of the data plane IC has exceeded the particular temperature value. In some embodiments, this particular temperature value is a threshold value that is lower than a maximum acceptable operating temperature of the data plane IC. This lower threshold value is selected in these embodiments in order to ensure that the data plane has sufficient time to increase its idle signal generation in order to cool off. In some embodiments, the control plane performs the process 200 for different detected data plane operating temperatures, in order to reconfigure the data plane's operation differently for different detected operating temperatures.

After detecting that the data plane's operating temperature has exceeded the particular temperature value, the control plane generates (at 210) new configuration data to reconfigure the idle signal generator(s) 188 of the data plane 105. In some embodiments, the control plane has a lookup table that stored different configuration data sets (that specify different rates of idle signal generation) for different detected data plane operating temperatures. The control plane in these embodiments identifies the configuration data set to supply to the data plane by using the detected temperature to identify the record in the lookup table that specifies the configuration data set.

At 215, the control plane supplies the generated configuration data set to the data plane 105 for storage in the configuration data store(s) 190 of the idle signal generator(s) 188. Next, at 220, the data plane starts to generate idle signals at the rate specified by the new configuration data set stored in the configuration data store(s) 190. As mentioned above, an idle signal generator 188 of the data fetcher 186 of the parsing circuit's arbitration unit retrieves the configuration data set from the configuration data store 190, and generates the idle signals at a rate specified by the configuration data set. The generated idle signals, in turn, reduce the power consumption of the data processing stage 135 and the de-parser 140, and thereby reduce the operating temperature of the data plane forwarding circuit. After 220, the process 200 ends.

Figure 3:
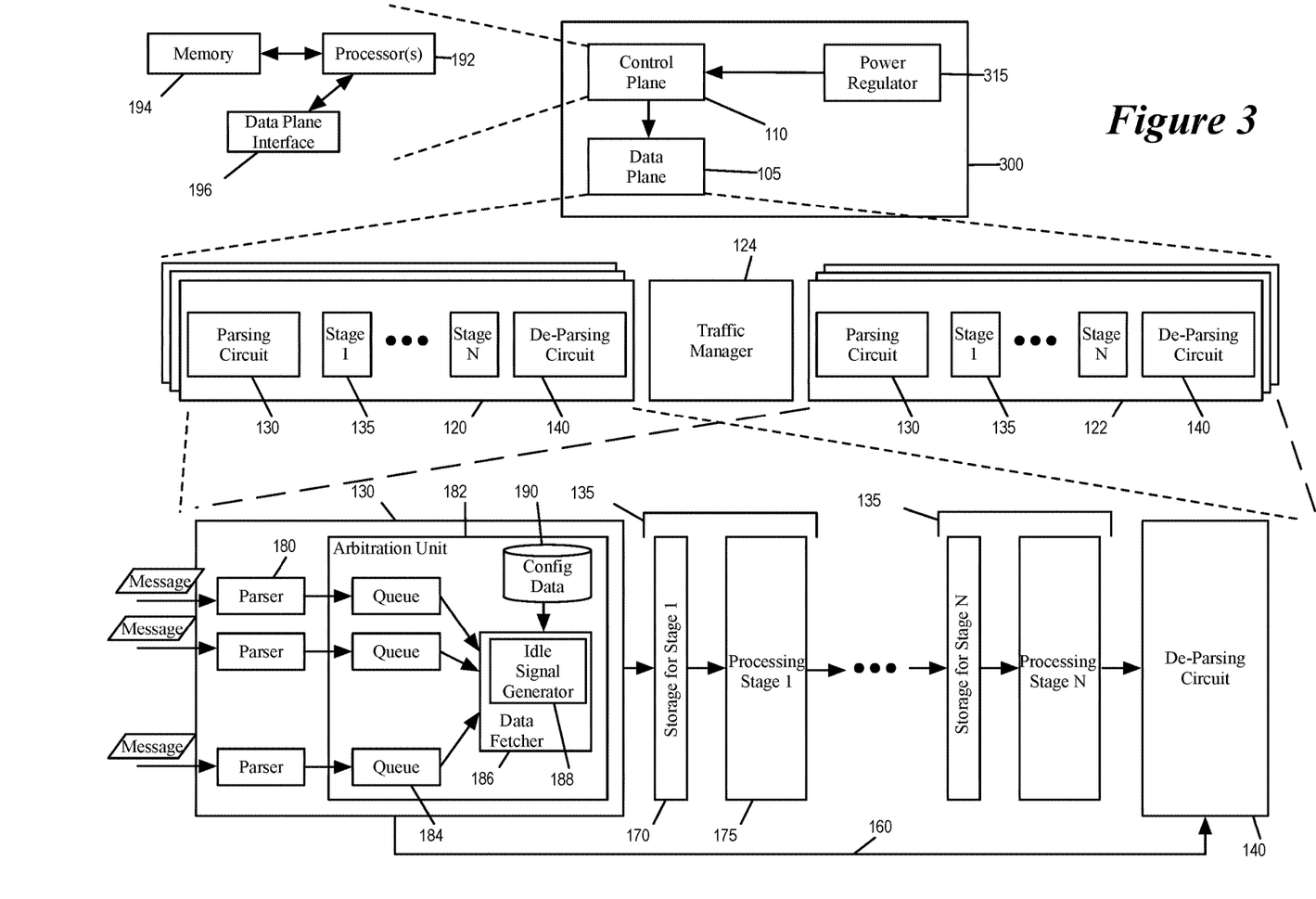
FIG. 3 illustrates a network forwarding element of some embodiments that injects idle signals through the data plane to control its power consumption.

Instead of, or in conjunction with, injecting idle signals to control temperature, the network forwarding element of some embodiments injects idle signals through the data plane to control the data plane's power consumption. FIG. 3 illustrates one such a network forwarding element. This network forwarding element 300 is similar to the network forwarding element 100 of FIG. 1, except that its control plane 110 reconfigures its data plane 105 in response to a signal from a power regulator 315. Based on the signal from the power regulator 315, the control plane 110 determines that the data plane, or the forwarding element that uses the data plane, has exceeded a threshold.

The power regulator 315 identifies the power consumed by the forwarding element and/or by the data plane forwarding circuit. For the embodiments illustrated by FIG. 3, the power regulator 315 is not part of the data plane forwarding circuit. Instead, it is an off-chip power regulator that is part of the network forwarding element. In other embodiments, the power regulator is an on-chip regulator that is implemented on the data plane forwarding circuit.

When the consumed power exceeds or nears a particular threshold value, the power regulator generates a signal that is supplied to the control plane 110 directly or indirectly (e.g., through another component of the forwarding element that generates a signal to the control plane in response to the signal from the power regulator). In response to this signal, the control plane 110 dynamically reconfigures idle-signal generators 188 in the data plane to increase the number of idle signals it generates in order to reduce the data plane's power consumption. As described above, the control plane 110 reconfigures these generators by writing new configuration data to the configuration data storages 190 accessed by the idle signal generators 188.

Based on the configuration data in these storages 190, the idle signal generators 188 generates idles signals, which the data fetchers 186 pass through the ingress or egress pipelines 122 or 124. The idle signals in some embodiments prevent the input storage units of the data processing stages from receiving the active clock signal, which prevents these storage units from changing their values (i.e., prevents them from changing state), and thereby allows them to consume less power. This power saving can be significant because the vast majority of the power consumption of a typical data plane forwarding circuit today is its dynamic power consumption (as opposed to its static power consumption).

Also, as mentioned above, maintaining the inputs of a data processing stage constant during two or more successive clock cycles causes that stage's processing modules (e.g., its match action units, memories, logic units, etc.) from performing new operations in one or more of the successive clock cycles, which further reduces the dynamic power consumption of the data plane forwarding circuit. Examples of operations that the stage's processing modules will not perform include instruction or data lookup operations, data write operations, arithmetic operations, etc.

Figure 4:
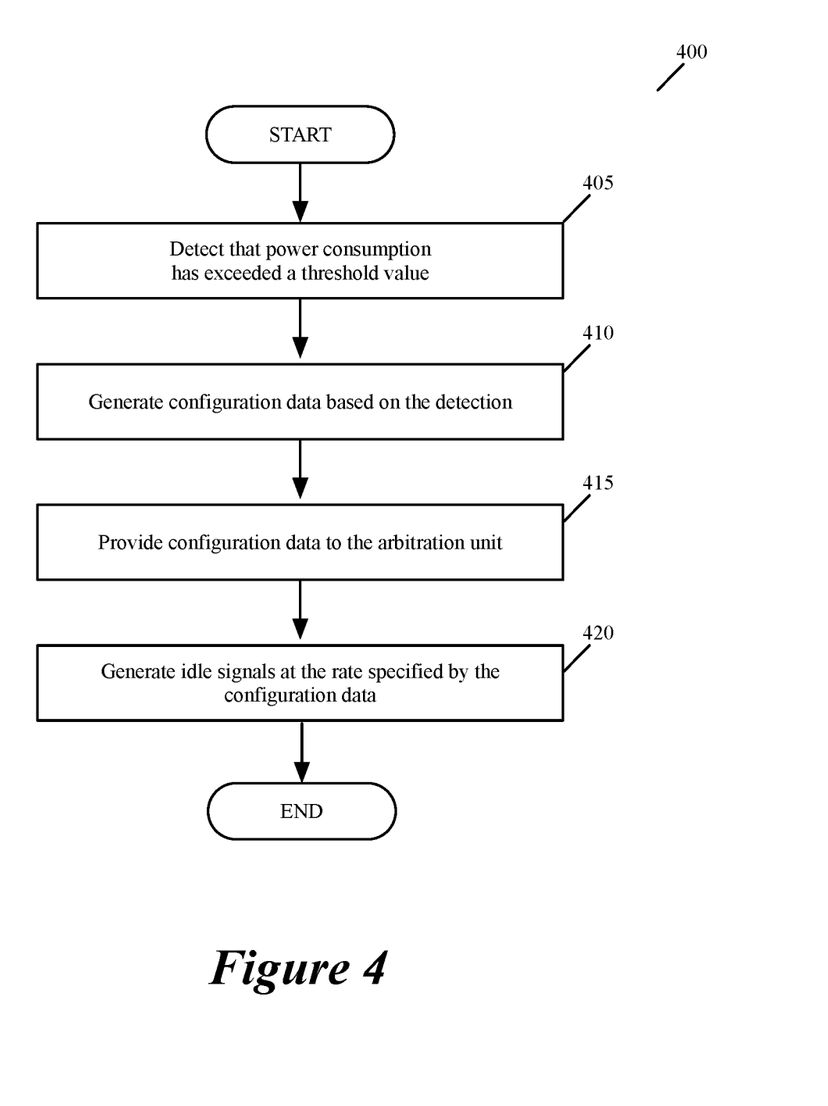
FIG. 4 illustrates a process that the network forwarding element of FIG. 3 performs in some embodiments.

FIG. 4 illustrates a process 400 that the network forwarding element 300 performs in some embodiments to increase the rate of idle signal generation in order to decrease the power consumption of its data plane forwarding circuit. The first three operations of the process 400 are performed by the control plane 110, while the fourth operation of this process is performed by the data plane 105. As shown, the control plane initially detects (at 405) that the power consumption of the forwarding element or data plane forwarding circuit has exceeded a particular power level.

In some embodiments, the control plane detects this condition when it receives a signal from the power regulator 315 that indicates that the power consumption of the forwarding element or data plane forwarding circuit has exceeded the particular power level. In some embodiments, this particular power level is a threshold value that is lower than a maximum acceptable power consumption of the forwarding element or data plane forwarding circuit. This lower threshold value is selected in these embodiments in order to ensure that the data plane forwarding circuit has sufficient time to increase its idle signal generation in order to reduce the monitored power consumption to the desired level. In some embodiments, the control plane performs the process 400 for different detected power consumptions, in order to reconfigure the data plane forwarding circuit's operation differently for different detected power consumptions.

After detecting (at 405) that the power consumption has exceeded the particular power level, the control plane generates (at 410) new configuration data to reconfigure the idle signal generator(s) 188 of the data plane 105. In some embodiments, the control plane has a lookup table that stores different configuration data sets (that specify different rates of idle signal generation) for different detected power consumptions the forwarding element or data plane forwarding circuit. The control plane in these embodiments identifies the configuration data set to supply to the data plane by using the detected power consumption to identify the record in the lookup table that specifies the configuration data set.

At 415, the control plane supplies the generated configuration data set to the data plane 105 for storage in the configuration data store(s) 190 of the idle signal generator(s) 188. Next, at 420, the data plane starts to generate idle signals at the rate specified by the new configuration data set stored in the configuration data store(s) 190. As mentioned above, an idle signal generator 188 of the data fetcher 186 of the parsing circuit's arbitration unit retrieves the configuration data set from the configuration data store 190, and generates the idle signals at a rate specified by the configuration data set. The generated idle signals, in turn, reduce the power consumption of the data processing stage 135 and the de-parser 140, and thereby reduce the power consumption of the data plane forwarding IC. After 420, the process 400 ends.

Figure 5:
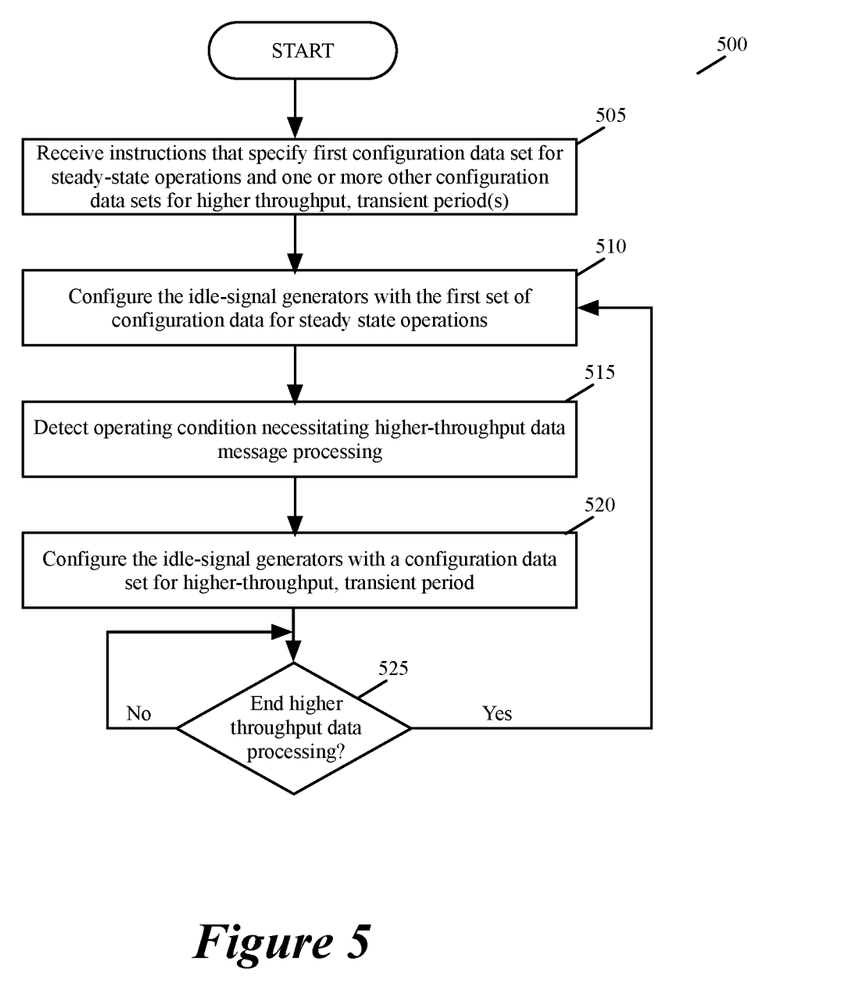
FIG. 5 illustrates a process that the network forwarding element performs in some embodiments to reconfigure its data plane to increase the data plane's data message processing throughput for transient periods of time.

Instead of increasing the number or frequency of the idle signals to reduce the data plane's operating temperature or power consumption, some embodiments dynamically reconfigure idle signal injecting circuit of the data plane to reduce the number of idle signals it generates, in order to increase the data message processing of the data plane for a transient period of time. FIG. 5 illustrates a process 500 that the network forwarding element performs in some embodiments to reconfigure its data plane to increase the data plane's data message processing throughput for transient periods of time. In this process, the data plane circuit is designed for a first data throughput rate, but it can for a time period increase its data message processing throughput to reach a higher second data throughput rate in order to alleviate the buildup of data messages in one or more queues in the data plane.

The process 500 starts when the data plane forwarding IC is designed for use in a particular network forwarding element. For different deployments in different network forwarding elements, a set of design tools can design different data plane forwarding ICs that are identical (i.e., are manufactured based on the same chip architecture and fabrication process) to meet different operating temperature and/or power consumption requirements. In some embodiments, one of the operations of the design tools is to define a first set of configuration data that specify the number or frequency of idle signals that the idle-signal generators 188 generate in the data pipeline during steady state operations.

At the start of the process 500, the control plane 110 receives (at 505), from the design tool set, instructions that specify the first configuration data set. The first configuration data set is for programming the idle-signal generators 188 to produce a particular number or frequency of idle signals while the data plane 105 operates under steady state conditions (e.g., while the queues of the data plane are not congested).

At 505, the control plane 110 also receives instructions that specify one or more other sets of configuration data that are for programming the idle-signal generators 188 to produce one or more different rates of idle signals during one or more higher throughput, transient periods. Some embodiments that specify different alternative configuration data sets use these different sets in order to provide multiple different types of data message throughput adjustments for different levels of queue congestions. Other embodiments just provide one alternative configuration data set for just one type of data message throughput adjustment when the data plane's queues are congested.

At 510, the control plane 110 configures the data plane's idle-signal generators 188 by writing the first configuration data set (for the data plane's steady state operations) into one or more sets of data plane storages through the data plane interface 196. In some embodiments, these data plane storages are the configuration data storages 190 accessed by the idle-signal generators 188. In other embodiments, the control plane writes the first configuration data set in data plane storages from where other data plane circuits retrieve the configuration data and store this configuration in the configuration data storages 190.

Figure 6:
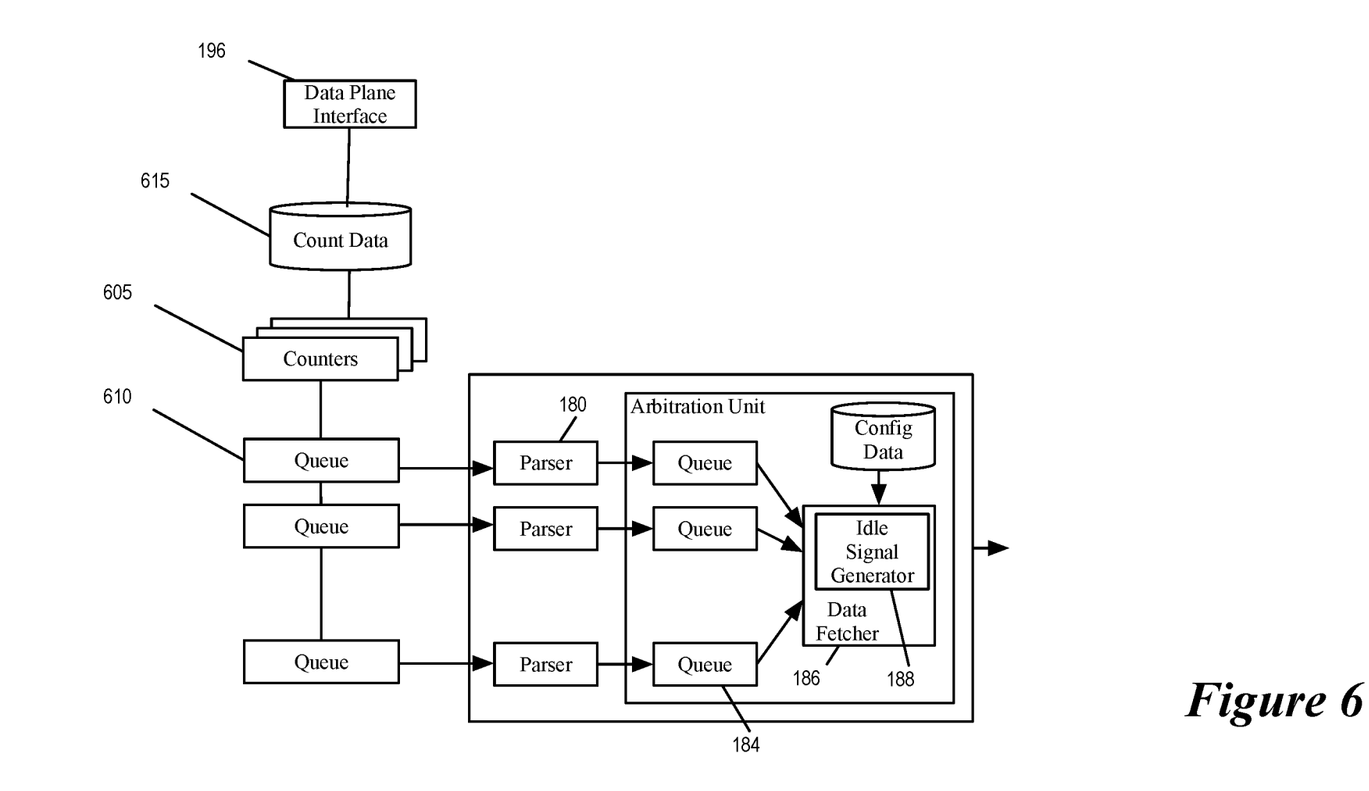
FIG. 6 illustrates that the data plane in some embodiments include counters for the data plane queues.

In some embodiments, the control plane has a set of one or more monitors that detect when a set of one or more queues have exceeded a particular depth. For instance, as shown in FIG. 6, the data plane in some embodiments includes counters 605 for the data plane queues 610 before the parsers 180 of the ingress pipelines 120. These counters maintain in a counter data storage 615 a count of the number of data messages stored at any given time in the queues for processing. In some embodiments, the counter data storage 615 is a set of registers, with each register in the set storing the count of one of the counters. At any given time, the count maintained by a counter indicates the current depth of (i.e., the current number of data messages awaiting processing in) the counter's associated queue 610. When this depth (i.e., when the count) exceeds a particular number, the counter's queue is deemed to have exceeded a particular acceptable threshold value.

In some embodiments, the control plane periodically accesses through the data plane interface 196 the counter data storage 615 to retrieve the count values of the counters. When the retrieved count values exceed a particular level, the control plane 110 detects (at 515) a condition that necessitates higher throughput, data message processing through the data plane to alleviate the buildup of data messages in the data plane. In some embodiments, the control plane can detect other conditions that necessitate higher throughput, data message processing through the data plane.

In response to the detected condition, the control plane 110 supplies (at 520) the idle-signal generators 188 with a new configuration data set in order to configure these idle-signal generators to reduce the number and/or frequency of their generated idle signals, which, in turn, allows the data fetchers 186 to push through the queued-up data messages through the data processing stages 135 at a faster rate. As mentioned above, the control plane 110 supplies the configuration data set either by writing the configuration data directly to the configuration data storages 190, or by storing this data in storages from which the data can be retrieved and stored in the configuration data storages 190. In some embodiments, the control plane 110 provides different configuration data sets based on different detected queue depths, e.g., provides a second configuration data set that configures the idle signal generators to reduce the idle signals to a first level when a queue depth has exceeded a first threshold value, or provides a third configuration data set that configures the idle signal generators to reduce the idle signals to a second level when the queue depth has exceeded a second threshold value.

The process 500 then transitions to 525, where it remains until the control plane determines that it should end higher throughput data message processing. In some embodiments, the control plane determines (at 525) that it should end higher throughput data plane message processing when it determines that the queue depth counts (stored in the count data storage 615) of the counters 605 has fallen below the threshold value. To make this determination, the control plane repeatedly retrieves count values stored in the count data storage 615 after reconfiguring the data plane to operate in a higher throughput state.

Also, in some embodiments, the data plane can only operate in the higher throughput state for relatively short transient periods, because it is designed to operate usually in its steady state. Accordingly, a period of time after configuring the data plane for higher throughput operations, the control plane in these embodiments ends (at 525) the higher throughput data processing of the data plane, and reconfigures the data plane for steady state operations by directly or indirectly writing the first configuration data set in the configuration data storages 190. To reconfigure the data plane, the process 500 returns back to 510, where the control plane provides first set of configuration data to the data plane's idle-signal generators 188 to configure them to go back to their steady state operations. After returning to 510, the process 500 transitions to 515 and waits there until the next time that it detects operating conditions necessitating higher-throughput data message processing.

In the example illustrated in FIG. 5, the process 500 reconfigures the data plane to operate at one higher throughput level before reconfiguring it to operate back at its steady state level. In other embodiments, however, the control plane can sequentially reconfigure the data plane's idle-signal generators with different configuration data sets that configure these generators to produce different reduced levels of idle signals. This approach allows the control plane to gradually try different higher levels of data plane data processing throughput in order to determine whether one of the lower throughput levels can alleviate the queue congestion.

In some embodiments, the data plane forwarding IC is configured by a set of design automation software tools that allows the data plane forwarding IC to custom select any subset of R features, from a set of S available features that can be implemented by the network forwarding IC (where R and S are integers and R is equal to or less than S), in order to stay within a desired power consumption level. Accordingly, the same manufacturer, or different manufacturers, of network forwarding elements that deploy the data plane forwarding ICs of some embodiments can differently configure two identical data plane forwarding ICs to implement two different subsets of features to operate within two different power consumption levels.

Figure 7:
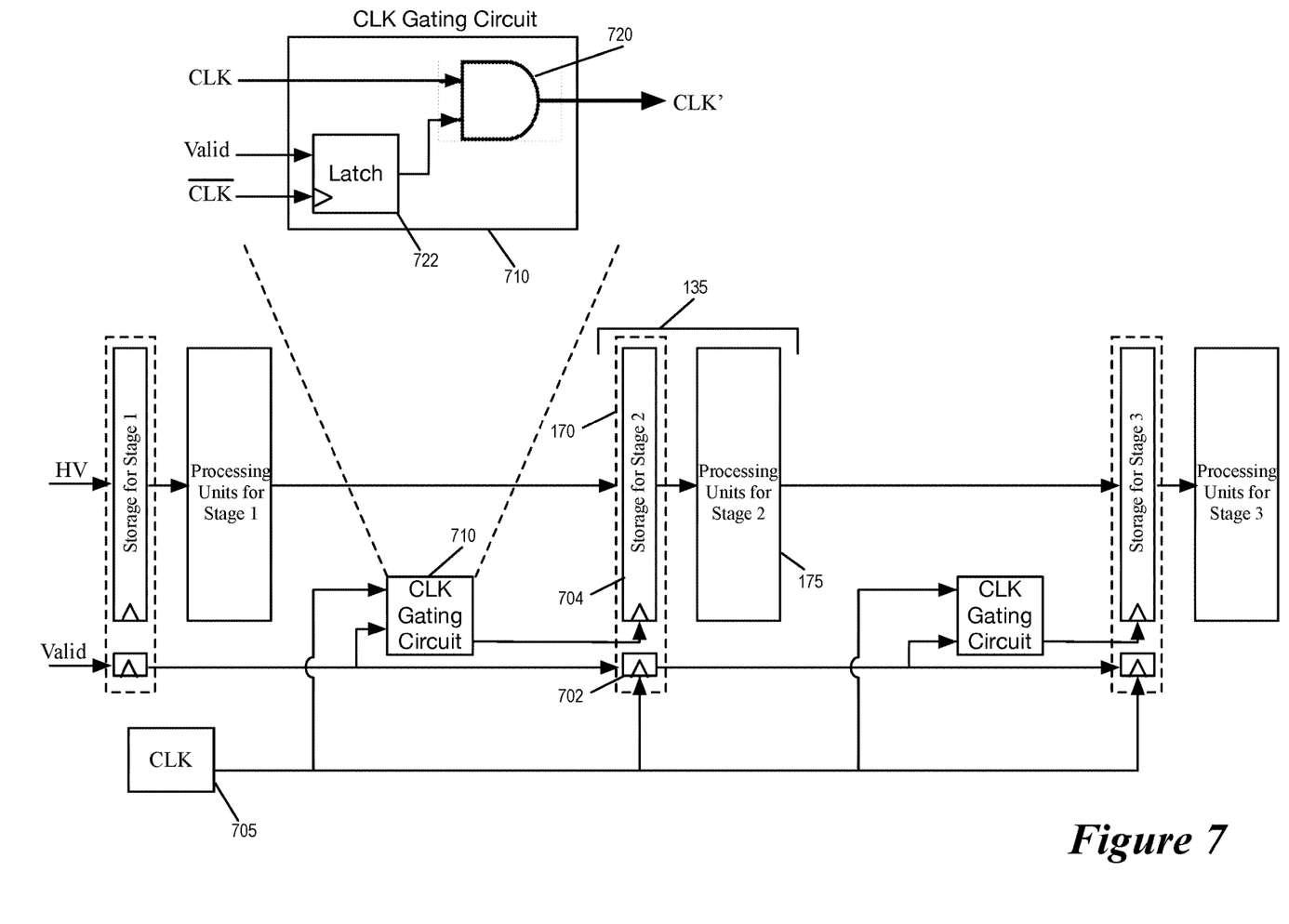
FIG. 7 illustrates the circuitry for placing a data processing stage in an idle state in response to an idle signal.

FIG. 7 illustrates the circuitry for placing a data processing stage in an idle state in response to an idle signal. As mentioned above, the idle signal in some embodiments is in the form of a header vector in which only one bit matters, a valid bit. Also, as mentioned above, each processing stage includes a set of storages 170 and a set of processing units 175. The storage set 170 includes a set of flips flops, which includes a valid bit flip-flop 702 and data flip-flops 704. The valid bit flip-flop 702 is clocked differently than the data flip-flops 704. Each valid bit register is clocked by a clock signal CLK produced by a clock signal generator 705, while the data flip-flops are clocked by a clock signal CLK' produced by a clock gating circuit 710, which generates this clock signal CLK' from the clock signal CLK, as further described below.

The valid bit controls the clock gating circuit for the data processing stage that receives this bit. When this valid bit is inactive (e.g., it has a low value) for a stage, the clock gating circuit 710 for that stage will not clock (i.e. will maintain the clock signal inactive for) the data flip-flops 704. This prevents the data flips flops 704 for that stage from changing the values that they store (i.e., from changing state). By not changing their state and remaining idle, the data flip flops for a stage that receives an inactive valid bit consumes less power, which over a sufficient number of idle cycles for a sufficient number of stages reduces the power consumption of the data plane and reduces the temperature of the data plane. Maintaining the inputs of a data processing stage constant during two or more successive clock cycles prevents that stage's processing units 175 from performing new operations in one or more of the successive clock cycles, which further reduces the dynamic power consumption of the data plane and thereby further allows the data plane to cool.

As shown in FIG. 7, the clock gating circuit 710 includes an AND gate 720 and a latch 722. The latch 722 for a clock gating circuit of any stage N receives the valid bit from the valid bit flip flop 702 of the prior stage N-1. This latch is clocked by the inverse of the clock signal CLK (also called clock bar). This allows the latch to store the previous stage's valid bit before the rising edge of clock signal CLK. This ensures that when the clock signal CLK is active (i.e., this signal is at its rising edge), the AND gate 720 has the valid bit from the previous stage at its other input. If the valid bit is active (e.g., it has a high value), the AND gate 720 outputs an active clock signal CLK' when the clock signal CLK rises. This enables the data flip flops of stage N to receive and store the header vector (HV) data output from the processing units 175 of stage N-1. On the other hand, when the valid bit is inactive (e.g., it has a low value), the AND gate 720 outputs an inactive clock signal CLK' and this prevents the data flip flops 704 from changing state.

While the invention has been described with reference to numerous specific details, one of ordinary skill in the art will recognize that the invention can be embodied in other specific forms without departing from the spirit of the invention. Accordingly, one of ordinary skill in the art would understand that the invention is not to be limited by the foregoing illustrative details, but rather is to be defined by the appended claims.

The invention claimed is:

1. A data-plane forwarding system, the data-plane forwarding system comprising:
a plurality of data processing stages to process packets received by the data-plane forwarding system, wherein two or more of the plurality of data processing stages comprise circuitry to process received packets and at least one match-action-unit (MAU) and wherein the received packets comprise header and payload portions, and
circuitry to (i) receive configuration data comprising at least one operating temperature, and (ii) adjust a level of packet processing activity of at least one data processing stage of the plurality of data processing stages based on the at least one operating temperature, wherein:
the circuitry is to adjust a level of packet processing activity of at least one data processing stage of the plurality of data processing stages based on the at least one operating temperature but not adjust a level of packet processing activity of at least one other data processing stage of the plurality of data processing stages,
the at least one data processing stage of the plurality of data processing stages having adjusted level of packet processing activity comprises an MAU, and
the at least one other data processing stage of the plurality of data processing stages not having an adjusted level of packet processing activity comprises an MAU.

2. The data-plane forwarding system of claim 1, further comprising one or more temperature sensors to detect temperature of the data-plane forwarding system, wherein the at least one operating temperature in the configuration data is based in part on the detected temperature.

3. The data-plane forwarding system of claim 1, wherein to adjust a level of packet processing activity of the at least one data processing stage based on the at least one operating temperature, the circuitry is to:
generate at least one idle signal for the at least one data processing stage to put the at least one data processing stage in an idle state to adjust a temperature of the data-plane forwarding system.

4. The data-plane forwarding system of claim 3, wherein the at least one idle signal is to prevent the at least one data processing stage from performance of one or more of: instruction or data lookup operations, data write operations, arithmetic operations, and/or a storage unit from changing state.

5. The data-plane forwarding system of claim 3, wherein receipt of the at least one idle signal is to prevent the at least one data processing stage from performance of a match-action operation to determine an action to perform on a received packet.

6. The data-plane forwarding system of claim 1, wherein the configuration data comprises at least one target power level and wherein the circuitry is to adjust a level of packet processing activity of the at least one data processing stage of the plurality of data processing stages to adjust power consumption of the data-plane forwarding system based on the at least one target power level.

7. The data-plane forwarding system of claim 6, further comprising a power regulator to identify power consumption of the data-plane forwarding system, wherein the at least one target power level is based in part on the identified power consumption.

8. The data-plane forwarding system of claim 6, wherein to adjust power consumption of the data-plane forwarding system based on the at least one target power level, the circuitry is to:
generate at least one idle signal for the at least one data processing stage of the plurality of data processing stages to put the at least one data processing stage in an idle state to adjust an operating power level of the data-plane forwarding system.

9. The data-plane forwarding system of claim 8, wherein the at least one idle signal is to prevent the at least one data processing stage from performance of one or more of: instruction or data lookup operations, data write operations, arithmetic operations, a storage unit from changing state, and/or performance of a match-action operation to determine an action to perform on a received packet.

10. The data-plane forwarding system of claim 1, wherein the data-plane forwarding system comprises a switch or a router.

11. A method for controlling a data-plane forwarding system that processes packets, the method comprising:
processing packets received by the data-plane forwarding system, wherein the data-plane forwarding system comprising a plurality of data processing stages, wherein two or more of the plurality of data processing stages comprise circuitry to process received packets and at least one match-action-unit (MAU), and wherein the received packets comprise header and payload portions; and
based on received configuration data, adjusting a level of packet processing activity of at least one data processing stage of the plurality of data processing stages based on at least one operating temperature or at least one operating power, wherein
the adjusting a level of packet processing activity of at least one data processing stage of the plurality of data processing stages based on at least one operating temperature or at least one operating power does not adjust a level of packet processing activity of at least one other data processing stage of the plurality of data processing stages,
the at least one data processing stage of the plurality of data processing stages, having the adjusted level of packet processing activity, comprises an MAU, and
the at least one other data processing stage of the plurality of data processing stages, not having an adjusted level of packet processing activity, comprises an MAU.

12. The method of claim 11, comprising detecting temperature of the data-plane forwarding system, wherein the configuration data causes adjustment of an temperature of the data-plane forwarding system based on the detected temperature.

13. The method of claim 11, wherein adjusting the level of packet processing activity of the at least one data processing stage comprises generating at least one idle signal for the at least one data processing stage to adjust an operating temperature of the data-plane forwarding system.

14. The method of claim 13, wherein the at least one idle signal prevents the at least one data processing stage from performance of one or more of: instruction or data lookup operations, data write operations, arithmetic operations, and/or a storage unit from changing state.

15. The method of claim 13, wherein the at least one idle signal prevents the at least one data processing stage from performance of match-action operations to determine an action to perform on the received packet.

16. The method of claim 11, wherein the configuration data causes adjusting the level of packet processing activity of the at least one data processing stage to achieve power consumption based on the at least one operating power.

17. The method of claim 16, wherein adjusting the level of packet processing activity of the at least one data processing stage comprises generating at least one idle signal for the at least one data processing stage to adjust an operating power level of the data-plane forwarding system.

18. A non-tangible computer-readable medium comprising instructions stored thereon, that if executed by one or more processors of a forwarding element, cause the one or more processors to:
adjust a level of packet processing activity of at least one data processing stage of a plurality of data processing stages to achieve an operating temperature range and/or operating power range based on received configuration data, wherein two or more of the plurality of data processing stages comprise circuitry to process received packets and at least one match-action-unit (MAU), wherein:
the adjust a level of packet processing activity of at least one data processing stage of the plurality of data processing stages to achieve an operating temperature range and/or operating power range based on received configuration data does not adjust a level of packet processing activity of at least one other data processing stage of the plurality of data processing stages,
the at least one data processing stage of the plurality of data processing stages, having adjusted level of packet processing activity, comprises an MAU, and
the at least one other data processing stage of the plurality of data processing stages, not having an adjusted level of packet processing activity, comprises an MAU.

19. The non-tangible computer-readable medium of claim 18, comprising instructions stored thereon, that if executed by one or more processors of the forwarding element, cause the one or more processors to:
generate at least one idle signal for the at least one data processing stage of the plurality of data processing stages to adjust an operating temperature and/or operating power of the forwarding element.

20. The non-tangible computer-readable medium of claim 19, wherein the at least one idle signal prevents the at least one data processing stage of the plurality of data processing stages from performance of one or more of: instruction or data lookup operations, data write operations, arithmetic operations, a storage unit from changing state, and/or performance of a match-action operation to determine an action to perform on a received packet.

21. The data-plane forwarding system of claim 1, wherein the at least one data processing stage of the plurality of data processing stages is to perform a first type of packet processing and at least one other data processing stage is to perform a second type of packet processing.

22. The data-plane forwarding system of claim 1, wherein the at least one operating temperature comprises a maximum temperature.

23. The data-plane forwarding system of claim 1, wherein the at least one operating temperature comprises a temperature range.

* * * * *